United States Patent [19]

Simpson

[11] Patent Number: 5,921,857
[45] Date of Patent: Jul. 13, 1999

[54] MEAT EMULSION PUMP CONTROL SYSTEM FOR MEAT ENCASING MACHINE, AND METHOD OF USE THEREOF

[75] Inventor: Michael S. Simpson, Norwalk, Iowa

[73] Assignee: Townsend Engineering Company, Des Moines, Iowa

[21] Appl. No.: 08/959,583

[22] Filed: Oct. 29, 1997

Related U.S. Application Data

[60] Provisional application No. 60/047,487, May 23, 1997.

[51] Int. Cl.[6] .................................................. A22C 11/00
[52] U.S. Cl. ............................................ 452/31; 452/46
[58] Field of Search .................................. 452/31, 30, 35, 452/46, 51

[56] References Cited

U.S. PATENT DOCUMENTS

| | | | |
|---|---|---|---|
| 4,218,003 | 8/1980 | Plewa et al. . | |
| 4,370,779 | 2/1983 | Meier | 452/35 |
| 4,451,954 | 6/1984 | Müller et al. | 452/35 |
| 4,602,402 | 7/1986 | Schnell | 452/31 |
| 5,092,813 | 3/1992 | Kasai et al. | 452/46 |
| 5,147,239 | 9/1992 | Staudenrausch | 452/30 |
| 5,197,915 | 3/1993 | Nakamura et al. . | |

*Primary Examiner*—Willis Little
*Attorney, Agent, or Firm*—Zarley, McKee, Thomte, Voorhees & Sease

[57] ABSTRACT

A meat encasing machine has a looper horn, linking chain and conveyor which, prior to production, have home positions which are determined. A pulsed signal is generated as the looper horn rotates and is transmitted to an amplifier from an encoder on the servo motor for the looper horn and the conveyor. The output pulse signal is then reduced in frequency so that it can be read by a PLC. The PLC counts the pulses in the signal and can determine the relative position of the looper horn based on the count and can therefore minimize the rotation of the looper horn in the home position at the beginning of each new cycle.

9 Claims, 3 Drawing Sheets

MEAT EMULSION PUMP CONTROL SYSTEM FOR MEAT ENCASING MACHINE, AND METHOD OF USE THEREOF

This application is based upon the applicants' provisional application Ser. No. 60/047,487 filed May 23, 1997.

BACKGROUND OF THE INVENTION

Meat encasing machines have a linker which uses a meat emulsion pump connected to a stuffing tube upon which a shirred casing is mounted. Meat emulsion is extruded from the stuffing tube into the casing and the filled casing is rotated by means of a chuck and delivered to a linker for creating a linked strand of sausages. The linked strand then passes through a rotating looping horn and loops of sausages from the strand are deposited on hooks of a conveyor located downstream from the horn. These conventional machines mechanically connect the operation of the horn and the conveyor to coordinate their respective functions. Special attention then must be given to coordinate the action of the pump with respect to the horn and the conveyor.

A cycle of the foregoing machine is completed as each "stick" of shirred casing is filled, and the pump is disengaged. The "stopped" portion of the horn needs to be assessed before a new cycle with a new shirred casing stick is implemented. While the down time between cycles is brief, in the order of 2 to 4 seconds or more of an 18 second cycle, this down time contributes to the inefficiency of the overall operation.

It is therefore a proposed object of this invention to reduce the down time between cycles in the operation of a sausage encasing machine.

It is a further object of the invention to simplify the operation of the pump clutch from cycle to cycle so as to reduce the down time between cycles.

SUMMARY OF THE INVENTION

The home position of the looper horn, linking chain and conveyor prior to production of a meat encasing machine are determined. A pulsed signal is generated as the looper horn rotates and is transmitted to an amplifier from an encoder on the servo motor for the looper horn and the conveyor. The output pulse signal is then reduced in frequency so that it can be read by a PLC. The PLC counts the pulses in the signal and can determine the relative position of the looper horn based on the count and can therefore minimize the rotation of the looper horn in the home position at the beginning of each new cycle.

DETAILED DESCRIPTION OF THE PREFERRED EMBODIMENT

Figure 1:
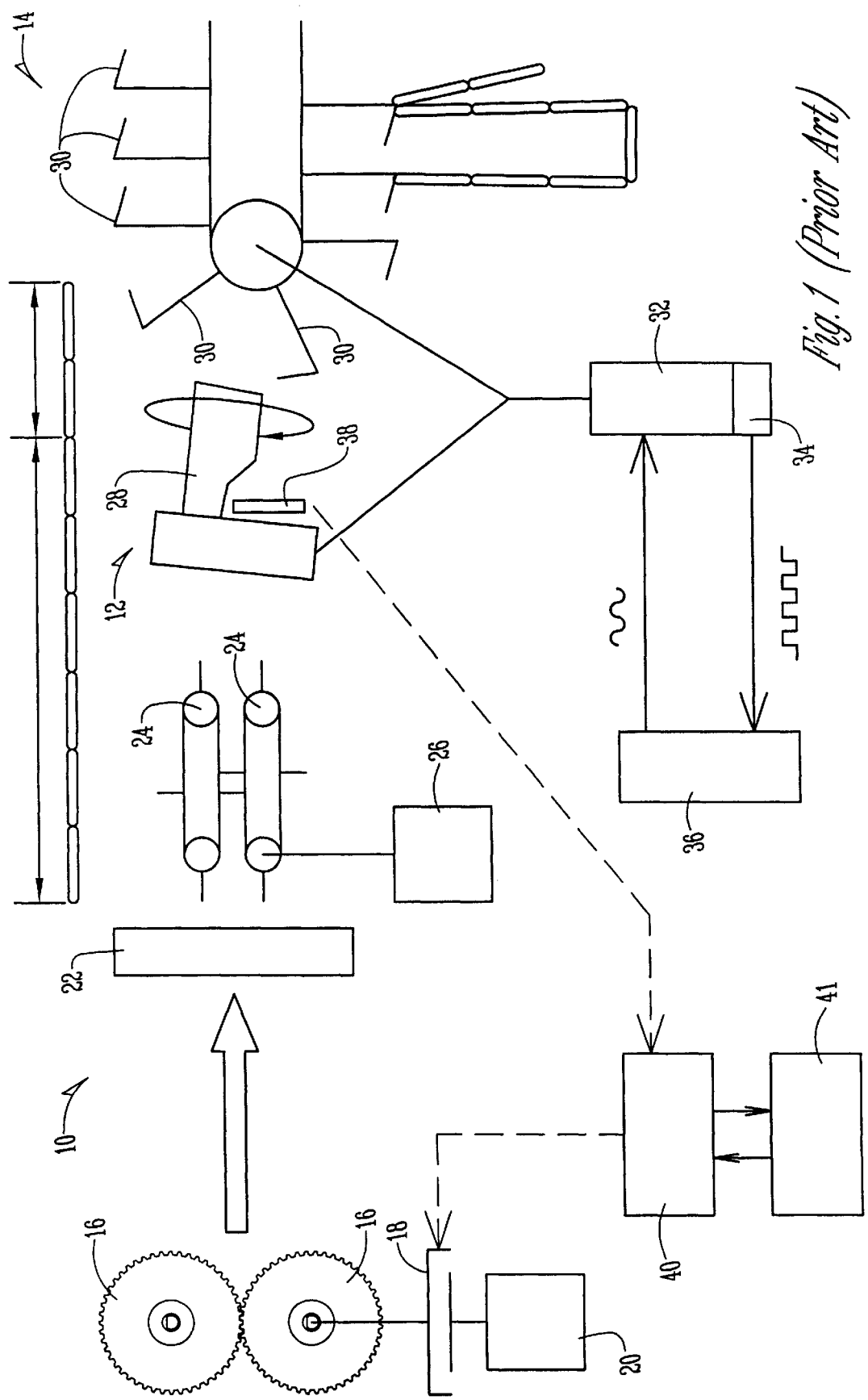
FIG. 1 is a schematic drawing of the components of a meat encasing machine of the prior art.
Figure 3:
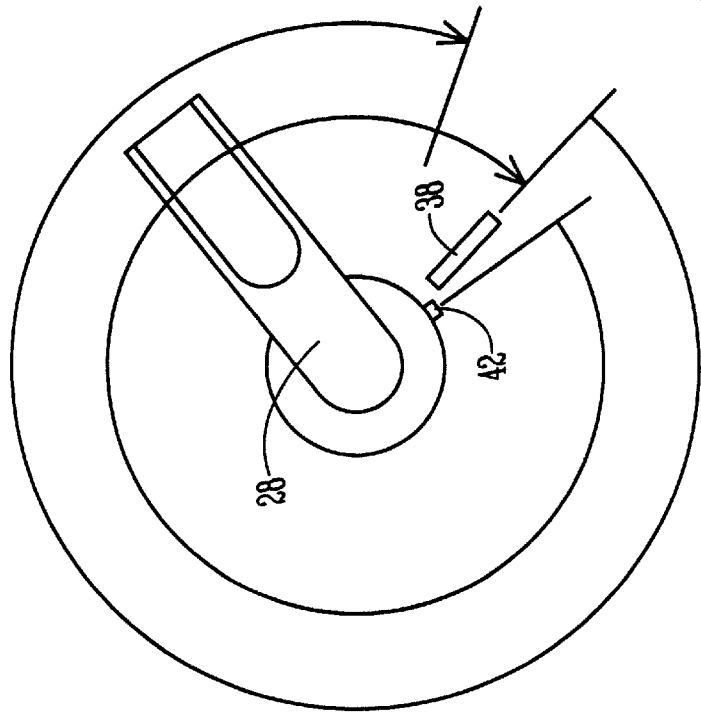
FIG. 3 is a schematic front elevational drawing of the looper horn of FIG. 1 showing variable positions thereof.
Figure 2:
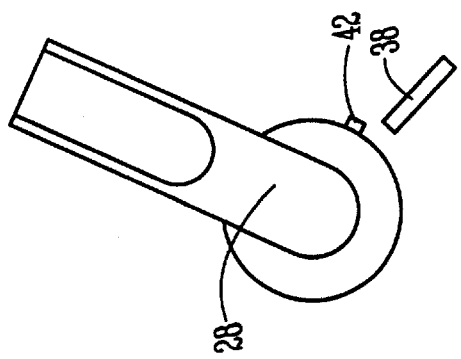
FIG. 2 is a schematic front elevational drawing of the looper horn of FIG. 3.
Figure 4:
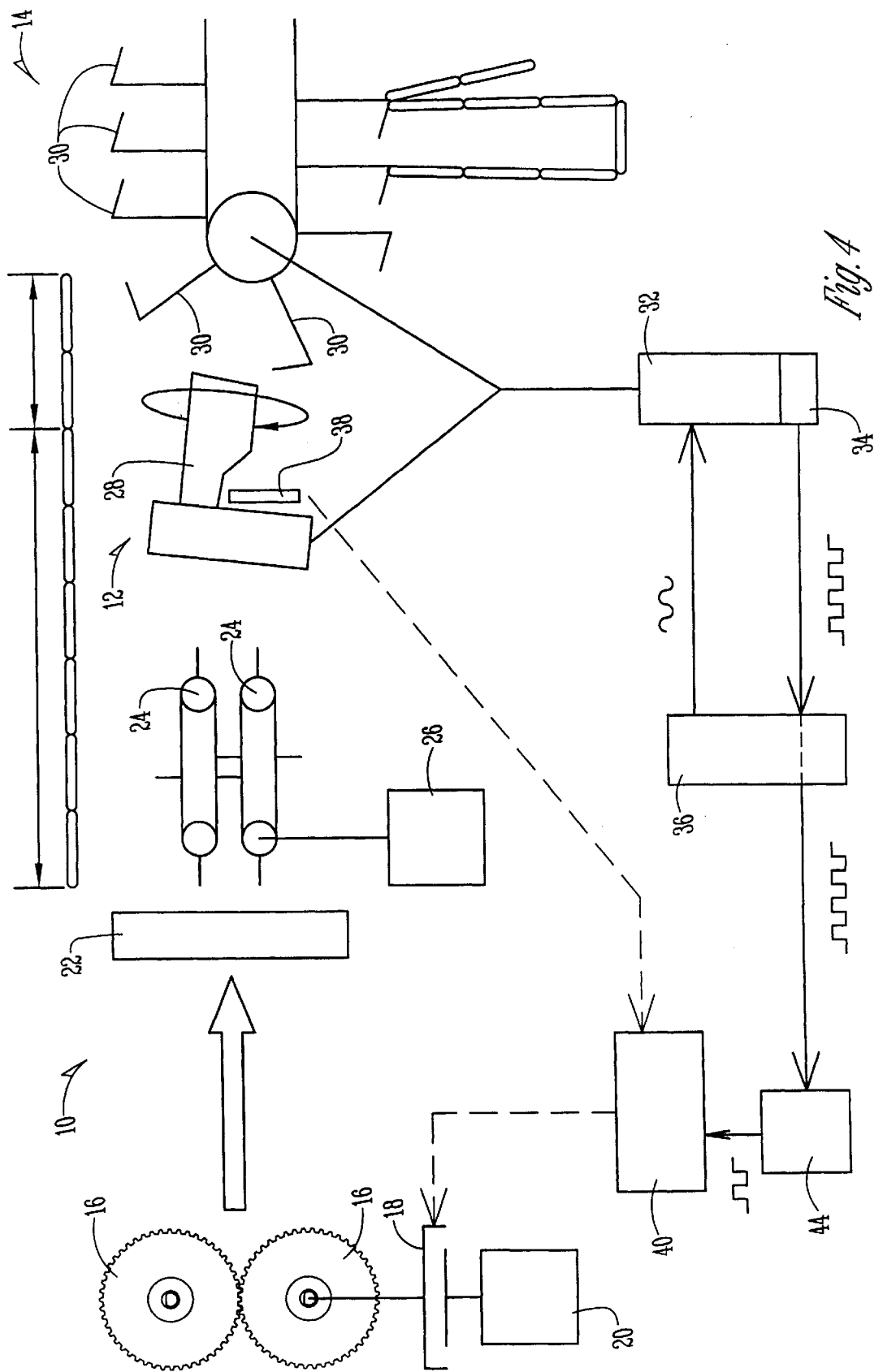
FIG. 4 is a schematic drawing of the components of a meat encasing machine of this invention.

While FIGS. 1 and 2 have been characterized as prior art, they actually only preceded in time the invention of FIG. 3 and 4, and are not deemed to be prior art in a 35 U.S.C. § 102 or 103 sense.

FIGS. 1 and 2 show a prior art machine of which the instant invention is an improvement. FIG. 1 is a diagram showing a linking machine 10, a looper 12, and a conveyor 14. As shown, the linker 10 includes a pair of pump metering gears 16 which are engaged or disengaged by a pump clutch 18. The pump motor 20 is used to drive the pump metering gears 16. The linker 10 also includes a twister 22 positioned upstream from the linking chains 24. The linking chains 24 are driven by a linker motor 26. As the links of meat product are linked by the linker 10, they are fed through a looper horn 28 which rotates in order to hang a predetermined number of links between a number of hooks 30 which are formed on the conveyor 14. As the horn 28 rotates, the conveyor moves so that the hooks 30 pick up a loop comprised of a predetermined number of links.

FIG. 1 also shows the system that controls the linker 10, the looper 12, and the conveyor 14. The looper 12 and conveyor 14 are both precisely controlled by a servo motor 32. Operatively coupled to the servo motor 32 is a servo encoder 34 which creates a quadrature feedback pulsed signal to the servo amplifier 36 which controls the operation of the servo motor 32.

The looper 12 includes a proximity sensor 38 which is operatively connected to a programmable logic controller (PLC) 40. The PLC 40 is also operatively connected to the pump clutch 18.

It is very important that the linking chains 24, looper 12, and conveyor 14 are precisely synchronized prior to production cycles. In order to set the correct positioning relationship between the linker chains 24 and the conveyor 14, a simple homing routine is performed. The linking chains 24 first jog at a predetermined slow constant velocity, while a photoelectric fixed field sensor waits to sense a butterfly (not shown) mounted on the linking chains 24. The butterfly elements are conventional (see U.S. Pat. No. 3,191,222, FIGS. 9 and 18). When a butterfly is sensed and passes by the sensor, a timer is started and eventually times out. When the timer times out, the linking chains are stopped with the intent of stopping a butterfly close to the twister chuck (not shown). The conveyor 14 also starts a homing routine after the linking chains 24 are finished homing.

FIG. 2 is a diagram of the looper 12. As shown, the looper horn 28 includes a stainless steel screw 42 which rotates along with the looper horn 28. At the beginning of the homing routine, the conveyor 14 jogs at a predetermined slow constant velocity while the sensor 38 waits to sense the passing of the stainless steel screw 42. When the screw 42 passes, a timer 41 is started and eventually times out. When the timer 41 times out, the conveyor 14 and looper horn 28 are stopped. One example of this routine is illustrated in FIG. 2. At the beginning of a cycle, the looper horn 28 must rotate around until the screw 42 encounters the proximity switch 38. This rotation is designated in FIG. 2 as the line "1". The looper horn 28 must then rotate to the virtual home position which is designated in FIG. 2 as the line "2". In the example shown in FIG. 2, the looper horn 28 must rotate almost two entire turns before reaching the virtual home position.

FIGS. 3 and 4 show an improved control system of the present invention. FIG. 3 is a diagram of the linker 10, looper 12, and conveyor 14 which are substantially the same as that shown in FIG. 1. However, the system shown in FIG. 3 homes and synchronizes the conveyor and looper in an improved manner. Like the system shown in FIG. 1, the looper 12 and conveyor 14 are driven by a servo motor 32 which includes a servo encoder 34 and a servo amplifier 36. Again, a quadrature pulsed signal created by the servo encoder 34 is fed back to the servo amplifier 32.

With the present invention, this pulsed signal is used by the PLC 40 to anticipate the looper horn 28. The feedback quadrature pulsed signal from the servo encoder 34 is preferably reduced in frequency to a level more usable by the PLC 40. To accomplish this, the servo amplifier divides the pulsed signal by eight and sends the signal to a divider 44 which divides the signal by four resulting in a pulsed signal having a frequency $1/32$ of the frequency of the feedback signal from the servo encoder 34. This divided pulsed signal is then provided to the PLC 40 and used as follows.

FIG. 4 is a diagram of the looper horn 28 and is structurally similar to that shown in FIG. 2. As shown in FIG. 4, a stainless steel screw 42 is coupled to the looper horn 28 and is rotatable with the looper horn 28. Also shown is a stationary proximity switch 38 which defines a reference point. The proximity switch 38 is operatively connected to the PLC 40. When the stainless steel screw 42 passes the proximity switch 38, a counter is reset to 0. As the looper horn 28 rotates, the pulses from the divider 44 are counted by the PLC 40. In the preferred embodiment, one full rotation of the looper horn 28 results in 750 pulses being counted. Since the number of pulses per rotation are constant, by counting the number of pulses, the PLC 40 will always know the relative position of the looper horn 28. At the beginning of each cycle, the looper horn 28 can then be positioned to the virtual home position without first rotating past the proximity sensor 38 like the prior art system shown in FIGS. 1 and 2.

In the example shown in FIG. 4, the proximity switch 38 is shown at the relative location of 0 and 750 pulses. If the looper horn 28 is stopped at the end of a cycle at the position designated as "1", the PLC 40 would have counted 50 pulses since the counter was zeroized when the screw 42 passed the proximity sensor 38. At the beginning of the next cycle, the PLC can bring the looper horn 28 to the virtual home position by rotating the looper horn until 625 more pulses are counted (in this example, the equivalent of 675 total pulses since the counter was zeroized). Note that the virtual home position is relative and therefore may be located at any other position. In the worst case scenario, the looper horn 28 would need to rotate slightly less than one full rotation before reaching the virtual home position.

In an alternative embodiment, the looper 12 is controlled such that upon reaching the end of a cycle, the looper horn 28 continues to rotate until it reaches the virtual home position or a predetermined position. In this way, at the beginning of the next cycle, the looper horn 28 will not have to be homed since it is already located at the virtual home position.

What is claimed is:

1. A method of synchronizing the operation of a meat emulsion pump on a meat encasing machine with the linking assembly and conveyor of the meat encasing machine, comprising, operatively connecting a motor having a feedback device to drive a rotatable looper horn and a sausage strand conveyor having a plurality of hooks thereon for receiving a loop of sausage links from a sausage strand delivered to the hooks by and through the looper horn, connecting the feedback device to a motor controller and providing a feedback signal from the feedback device to the motor controller, conveying the feedback signal to an electronic controller, sensing a home position of the linking assembly and the hooks of the conveyor at the end of a first cycle of said machine, determining the relative position of the looper horn based on the feedback signal, and causing said electronic controller to emit a feedback signal to operate a clutch to operate said emulsion pump each time said looper horn rotates through a home position.

2. The method of claim 1 further comprising the step of reducing the frequency of the feedback signal from the motor controller before conveying the same to the electronic controller.

3. The device of claim 2 wherein said electronic controller has a command module wherein said computer can cause said horn to park at a predetermined park position.

4. The device of claim 3 wherein said park position will be separate but closely adjacent said home position.

5. The device of claim 2 wherein said electronic controller is operatively connected to said horn to fine tune the home position of said horn.

6. The method of claim 1 further comprising the step of decoding the feedback signal to determine the relative position of the looper horn.

7. The method of claim 6 further comprising the step of rotating the looper horn to the home position.

8. A meat encasing machine having a meat emulsion pump, an operating clutch secured to the meat emulsion pump, a linking assembly including a rotatable looper horn, and a conveyor with a plurality of hooks thereon positioned downstream from said looper horn, the invention comprising, a motor having a feedback device operatively connected to said looper horn and to said conveyer for receiving a loop of sausage links from a sausage strand delivered to the hooks by and through the looper horn, a motor controller connected to the motor feedback device to receive a feedback signal from the feedback device, an electronic controller operatively connected to said motor controller to receive a pulsed signal from the motor controller, sensing means on said machine for detecting a home position of the linking assembly and the hooks of the of said machine, determining the position of the looper horn based on the pulsed signal, said electronic controller operatively connected to said pump for operating said pump any time said looper horn rotates to said home position.

9. The machine of claim 8 further comprising reduction means on said machine for reducing signal from the motor controller.

* * * * *